D. B. SALSTROM.
SPINDLE BEARING.
APPLICATION FILED NOV. 4, 1907.
1,013,847.
Patented Jan. 2, 1912.
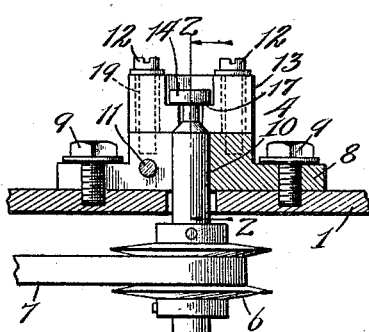
*Fig. 1.*
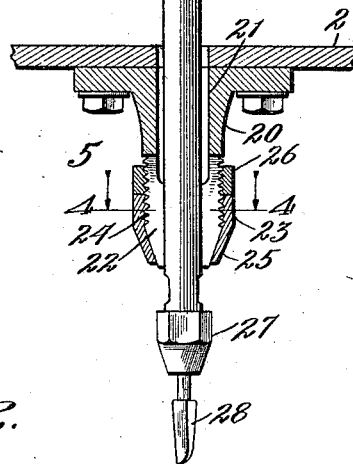
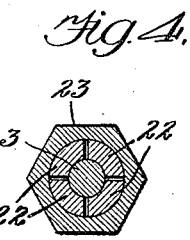
*Fig. 4.*
*Fig. 2.*
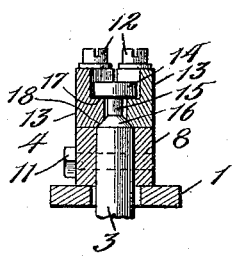
*Fig. 3.*
Witnesses:
Ira D. Perry
Robert H. Weir
Inventor:
David B. Salstrom
By Luther L. Miller
His atty.

UNITED STATES PATENT OFFICE.

DAVID B. SALSTROM, OF CHICAGO, ILLINOIS, ASSIGNOR OF ONE-HALF TO EMANUEL KOPRIWA, OF CHICAGO, ILLINOIS.

SPINDLE-BEARING.

1,013,847.           Specification of Letters Patent.           Patented Jan. 2, 1912.

Original application filed July 19, 1906, Serial No. 326,834. Divided and this application filed November 4, 1907. Serial No. 400,510.

*To all whom it may concern:*

Be it known that I, DAVID B. SALSTROM, a citizen of the United States, residing at Chicago, in the county of Cook and State of Illinois, have invented certain new and useful Improvements in Spindle-Bearings, of which the following is a specification.

This application is a division of my copending application Serial No. 326,834 filed July 19, 1906.

The present invention relates to bearings for rotating machine elements, and is herein shown as applied to the tool spindle bearings of a wood-carving machine. Such spindles are rotated at very high speeds, the speed and the shock experienced by the mechanism when the tools engage the work tending to set up vibrations that injuriously affect the quality of the work.

The object of this invention is to provide improved means of support for tool-spindles which shall prevent injurious vibration and lateral and longitudinal movement of the spindle in its bearings, and permit of taking up wear in said bearings.

In the accompanying drawings, Figure 1 is a fragmental sectional view of the movably-supported spindle-carrying head of a wood-carving machine, said head being provided with spindle bearings embodying the features of my invention. Fig. 2 is a sectional view through the upper bearing taken on the plane of dotted line 2 2 of Fig. 1. Fig. 3 is a top plan view of the upper spindle bearing. Fig. 4 is a sectional view through the lower bearing the view being taken in the plane of line 4 4 of Fig. 1.

In the embodiment selected for illustration, the movably-supported spindle-carrying head comprises an upper frame member 1 and a lower frame member 2. The upper end of the spindle 3 is supported in a bearing 4 on the frame member 1, and the lower portion of said spindle extends through a bearing 5 upon the lower frame member 2. Between the frame members 1 and 2 the spindle 3 is provided with a pulley 6 receiving a drive belt 7.

The upper bearing 4 comprises a block 8 fastened to the frame member 1 by screws 9, said block having an opening 10 extending vertically therethrough. At one side of said opening the block 8 is split, the two sections thus formed being arranged to be drawn together by a screw 11 to tighten the block 8 upon the upper part of the spindle. Attached to the upper end of the block 8 by screws 12 are two blocks 13, said blocks being adapted to receive between them the upper end of the spindle. The latter is reduced in diameter near its upper end to form a flange 14, a neck 15 and a conical annular shoulder 16. The blocks 13 are similar, each being recessed upon its inner side so as to form between said blocks a shoulder 17 upon which the under side of the flange 14 bears, and a conical surface 18 adapted to bear upon the conical shoulder 16. The openings 19 in the blocks 13 through which the screws 12 extend are of greater diameter than said screws in order to permit of a sidewise adjustment of said blocks. It will be seen that said blocks may be moved toward each other to take up wear upon the flange 14 and the shoulder 16 and thus prevent endwise movement of the spindle.

The lower bearing 5 comprises a member 20 having an opening 21 therein through which the spindle extends. The lower end of the member 20 is radially slitted to provide any desired number of spring fingers 22 (Fig. 4) surrounding the spindle. In this instance, the member 20 is exteriorly screw-threaded to receive a means for compressing the fingers 22 upon the spindle. Said compressing means comprises a sleeve 23 internally screw-threaded at 24 and having at its lower end an internally tapered or conical portion 25 adapted to receive within it the conical lower end of the set of fingers 22. The sleeve 23 is secured in adjusted position by means of a lock nut 26. The sleeve 23 externally is of hexagonal form to receive a wrench for turning it when the bearing 5 is to be adjusted.

At the lower end of the spindle 3 is a chuck 27 of any suitable construction for receiving a tool 28. The bearings 4 and 5 for the spindle 3 being located relatively far apart, the tendency to vibration when the spindle is rapidly rotated is materially reduced. Such vibration is further reduced by the construction herein shown of said bearings. As shown, each of the bearings is provided with means for taking up any looseness therein and for preventing lateral or endwise movement of the spindle.

In operation the rapid rotation of the spindle 3 tends to loosen the hold of the blocks 13 upon the spindle. Said blocks may be adjusted to hold the spindle firmly between them by means of the screws 12. In practice the blocks may generally be moved sufficiently to hold the upper end of the spindle steady by merely tapping said blocks.

It is apparent that various changes may be made in the construction herein shown without departing from the spirit of the invention. I therefore do not limit myself to the details herein set forth.

I claim as my invention:

1. The combination, with a spindle having a head and a conical annular shoulder, of a bearing comprising a block having an opening therein to receive the spindle, said block being split at one side of said opening; a screw extending through the split portion for tightening said block upon said spindle; two blocks each having a shoulder upon which said head bears, and an annular conical shoulder adapted to contact the shoulder upon the spindle; and means for adjustably securing said last mentioned blocks to the first mentioned block.

2. The combination with a spindle having an annular groove formed therein near its upper end, said groove providing a head of the same diameter as the spindle, one wall of said groove being conical, a bearing block in which said spindle is rotatably mounted below said groove, one side of said block being split, means acting upon said split portion for compressing said block to hold the spindle against lateral vibration, a pair of blocks mounted upon said bearing block at opposite sides of the spindle, and means for securing said pair of blocks for adjustment toward the spindle, each block of said pair of blocks having two shoulders thereon to contact the opposite walls of said groove, one of said shoulders being inclined to correspond with the conical wall of the groove.

DAVID B. SALSTROM.

Witnesses:
C. P. PARKER,
GEORGE L. CHINDAHL.

Copies of this patent may be obtained for five cents each, by addressing the "Commissioner of Patents, Washington, D. C."